Figure 1:
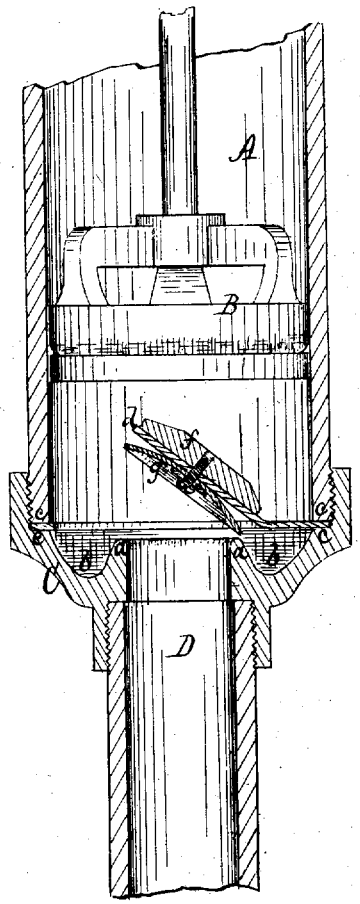

No. 4,356. REISSUED APR. 25, 1871.

W. H. POLLARD.

PUMP VALVE.

Witnesses
R. F. Osgood
Fred. A. Hatch.

Inventor
William H. Pollard
By J. Fraser Vlo.
Attys
Rochester N.Y.

THE MORRIS PETERS CO., PHOTO-LITHO., WASHINGTON, D. C.

United States Patent Office.

WILLIAM H. POLLARD, OF SENECA FALLS, NEW YORK, ASSIGNOR TO THE GOULDS' MANUFACTURING COMPANY.

Letters Patent No. 73,038, dated January 7, 1868; reissue No. 4,356, dated April 25, 1871.

IMPROVEMENT IN PUMP-VALVES.

The Schedule referred to in these Letters Patent and making part of the same.

*To all whom it may concern:*

Be it known that I, WILLIAM H. POLLARD, of Seneca Falls, in the county of Seneca and State of New York, did invent a certain new and useful Improvement in Pumps, patented January 7, 1868, of which "The Goulds' Manufacturing Company," of Seneca Falls aforesaid, is sole assignee; and I do hereby declare that the following is a full, clear, and exact specification of the same.

*Nature of the Invention.*

This invention consists in an elevated valve-seat, having a rounded top, combined with an ordinary valve, the object being to prevent the lodgment of, and consequent obstruction by, sand in what is known as "tube-wells."

*General Description.*

In the drawing—

Figure 1 is a central vertical section of the improved pump.

Figure 2:
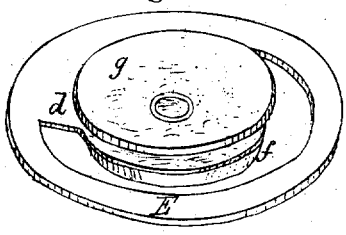

Figure 2, a perspective view of the under side of the induction-valve.

A is a pump-cylinder of ordinary form;

B, the plunger;

C, the base of the pump; and

D, the end of the driven tubing screwed therein.

The base of the pump is provided with an elevated convex seat, *a*, having a groove, *b*, around for the deposit of the sand that is drawn into the pump. This seat is not made square-topped, as in other pumps, but is made rounding, or so formed as to present but little surface for the lodgment of sand on top, as clearly shown.

The induction-valve consists of a ring, E, of leather, fitting between the shoulders *c c*, and provided with a tongue, *d*, with which is connected a weight, *f*.

On the bottom of this valve is attached a disk, *g*, of concave form on its under side, preferably made of rubber, and of such size as to cover the valve-seat when it strikes thereon. I sometimes dispense with the disk *g*, as the elevated rounded valve-seat described, combined with the valve, as described, without the disk *g*, is sufficient for most purposes.

The great difficulty in operating pumps connected with driven wells occurs from the sand which is drawn in and obstructs the lower valve. To remedy this the valve-seat has before been elevated to allow the sand to deposit outside; but even in that case the grains lodge on top of the seat, which is made square or plain-surfaced. This prevents the valve from closing tightly, thus causing leakage. I prevent this difficulty not only by the employment of the concave disk *g*, which, by its expansive action in closing, sweeps off the grains of sand, but also especially by the round or similarly-formed top of the seat, which prevents the lodgment of the sand.

I have proved by long-continued use that, while the square-topped seat is not effective in the pumps of driven tubing, the round-topped one is, and answers the purpose where all other remedies have failed.

*Claims.*

What I claim as the invention of the said WILLIAM H. POLLARD is—

1. The elevated convex valve-seat *a*, constructed or formed with the rounded or similarly-shaped top described, when combined with a valve acting above and striking upon said seat, as herein specified.

2. The combination of the concave disk *g* of the valve with the elevated convex seat *a*, arranged as described, and operating in the manner and for the purpose specified.

In witness whereof I have hereunto set my hand this 1st day of December, 1870.

WM. H. POLLARD.

Witnesses:

R. N. HEBBERD,

C. S. HOOD.